United States Patent [19]

Hauser et al.

[11] Patent Number: 5,464,680
[45] Date of Patent: Nov. 7, 1995

[54] PLASTIC-COATED CONCRETE FORM PANEL

[75] Inventors: Edward R. Hauser, St. Joseph, Wis.; David D.-L. Lu, Ramsey, Minn.

[73] Assignees: WorldTech Coatings, Inc.; Ralph N. Hakim, Vancouver, Wash.

[21] Appl. No.: 319,489

[22] Filed: Oct. 6, 1994

Related U.S. Application Data

[63] Continuation of Ser. No. 64,788, May 21, 1993, abandoned, which is a continuation of Ser. No. 776,604, Oct. 11, 1991, abandoned, which is a continuation-in-part of Ser. No. 647,486, Jan. 25, 1991, abandoned.

[51] Int. Cl.$^6$ ............................. B32B 21/08; B32B 27/40
[52] U.S. Cl. ....................... 428/141; 428/335; 428/336; 428/413; 428/414; 428/423.3; 428/423.7; 428/424.4; 428/425.1; 428/425.3; 428/528
[58] Field of Search ..................................... 428/413, 414, 428/423.1, 423.3, 423.7, 424.4, 425.3, 335, 336, 528, 425.1, 141

[56] References Cited

U.S. PATENT DOCUMENTS

| | | | |
|---|---|---|---|
| 3,240,618 | 3/1966 | Hemming | 117/5.1 |
| 3,427,178 | 2/1969 | Zakim | 117/5.1 |
| 3,468,690 | 9/1969 | Hemming | 117/5.1 |
| 3,650,795 | 3/1972 | Willingham | 117/5.1 |
| 3,666,593 | 5/1972 | Lee | 156/285 |
| 3,703,394 | 11/1972 | Hemming et al. | 428/313.5 |
| 4,677,029 | 6/1987 | Frisch | 428/423.1 |

FOREIGN PATENT DOCUMENTS

| | | |
|---|---|---|
| 817371 | 7/1969 | Canada . |
| 0334166 | 9/1989 | European Pat. Off. . |
| 3-203606 | 9/1991 | Japan . |
| 3-203605 | 9/1991 | Japan . |
| 1166742 | 5/1966 | United Kingdom . |
| 1126094 | 9/1968 | United Kingdom . |
| 1249107 | 10/1971 | United Kingdom . |

OTHER PUBLICATIONS

Weyerhauser Co. product literature PW–188, 8–72; PW–143, 2–75; PW–174, 2–69; PW–173, 1–69; PW–172, 1–69; PW–1012, 6–71; and PW–1070, 5–74.

Thomas J. Reading, *Concrete International*, Jul. 1985, pp. 15–22.

Reichhold Chemicals, Inc., Product Bulletin TD–84049.

Chemical Abstract, vol. 81, No. 6, 11 Aug. 1975, Columbus, Ohio, US; abstract no. 44837W, Masumoto et al; 'Coating Using Polyurethane Resin Paint' p. 80, column 2.

Chemical Abstracts, 83 (1975) 44837W.

*Primary Examiner*—D. S. Nakarani
*Attorney, Agent, or Firm*—David L. Garrison; Stephen M. Evans

[57] ABSTRACT

Plastic-coated plywood, useful as a concrete form panel, having a topcoat of catalyzed moisture-cured isocyanate-terminated urethane prepolymer with a smooth surface having high gloss, durably adhered to the plywood by an alkali-resistant seal-prime coat.

13 Claims, No Drawings

PLASTIC-COATED CONCRETE FORM PANEL

This is a continuation of application Ser. No. 08/064,788 filed May 21, 1993, now abandoned, which is a continuation of application Ser. No. 07/776,604 filed Oct. 11, 1991, now abandoned, which is a continuation-in-part of application Ser. No. 07/647,486 filed Jan. 25, 1991, now abandoned.

This invention relates to plastic-coated substrates, such as concrete form panels made from plywood sheets having a face coated with moisture-cured urethane isocyanate prepolymer and used in constructing molded concrete structures, such as walls and floors of buildings. In another aspect, it relates to a method of manufacturing such coated concrete form panels. In a further aspect, it relates to a coating system useful in said method of manufacturing.

Plywood is a basic kind of structural wood panel comprising a flat assembly of bonded thin sheets or plies of wood and such panels have been widely used for fifty years or so as a building or construction material. A large amount of plywood manufactured today by the lumber industry is used as concrete form panels in constructing concrete structures.

Concrete form panels are used generally as sheeting in temporary concrete formwork to mold freshly placed concrete poured into the formwork and retain it until it sets and gains sufficient strength. The formwork is thereafter removed and the panels stripped from the hardened self-supporting concrete structure. Economy is a major concern to the concrete contractor because the formwork costs alone may be from 35 to as high as 60 or 70 percent of the cost of the concrete structure.

Various techniques and modifications have been proposed or used to improve the quality and usefulness of plywood concrete form panels and save formwork costs. To these ends, principal attention has been focused on means to improve the durability of the panels to get their maximum reuse and to improve the smoothness and integrity of the face of the panel against which the concrete is hardened so that the panel may be readily stripped therefrom without damage to the panel and without adversely affecting the smoothness and desired appearance of the finished concrete surface.

A number of oils and other materials have been applied to plywood concrete form panels as release agents to improve the stainability and other characteristics or properties of the panels—e.g., see the study of release agents described by Thomas J. Reading in *Concrete International*, Jul. 1985, pp. 15 to 22.

Another approach to improving strippability and reuse of plywood concrete form panels and the like is to apply various plastic coatings to the face of the panel. In this respect, see the related U.S. Pat. Nos. 3,240,618, 3,468,690, and 3,703,394 of Charles B. Hemming and others describing smooth coated panels said to impart to the formed concrete a very desirable gloss and velvety smooth surface without staining. Said U.S. Pat. No. 3,240,618 describes using "form oil," such as an SAE 10 to 30 paraffinic type hydrocarbon oil, to impregnate the plywood and then coating it with a moisture-curable isocyanate-terminated urethane prepolymer to form a porous polyurethane film adhered to the oil-coated surface. Said U.S. Pat. No. 3,468,690 describes a modification of the foregoing, wherein form oil is blended with the polymer, which can be made from Spenkel™ M86-50CX one-package moisture-cured urethane coating or a two-package, prepolymer/catalyst system, one such catalyst being Dabco™ 1,4-diaza(2.2.2)-bicyclooctane applied or added to the prepolymer. Said U.S. Pat. No. 3,703,394 describes the further modification of dispersing microspheric particles of polyolefinic materials in the polyurethane film which can be applied by spraying resin and catalyst from separate spray guns mounted so that they mix at the panel surfaces. Reichhold Chemicals, Inc. describes in its Product Bulletin TD-84049 1/90 Spenkel® M86-A6X-50 one-package moisture-cure urethane prepolymer and suggest its use as coating for plywood concrete forms.

Other patents describing use of moisture-curable polyurethane or urethane prepolymer for concrete molds are U.S. Pat. Nos. 3,427,178 (Zakimi et al.) and 3,650,795 (Willingham). Isocyanate-impregnated paper which is adhered as an overlay to plywood concrete form is described in U.S. Pat. No. 3,666,593 (Lee). U.S. Pat. No. 4,677,029 (Frisch et al) discloses coating a substrate, e.g. wood, with a composition comprising aliphatic polyisocyanate and tertiary amine "polyahl" and contacting the coated substrate with the vapor of a urethane catalyst, such as a tertiary amine.

The American Plywood Association (APA) permits its member mills to use APA trademarks on structural wood panels that have been manufactured to meet the requirements of APA performance standards. In APA's 1989 Source List on Plywood Concrete Form Panels, descriptions are set forth of different grades of APA plywood for concrete form use, such as B-C Exterior, B-B Plyform, Medium Density Overlaid (MDO) Plyform and High Density Overlaid (HDO) Plyform. "Plyform" is an APA trademark for a plywood panel, treated with an oil in the mill, specifically manufactured for concrete forms, and generally reoiled initially and between uses in the field.

In the late 1960s and early 1970s, a moisture-cure isocyanate-terminated urethane prepolymer (Spenkel™ MC-2140 or Q-Thane™ MC-40) was used in the manufacture of primed plastic-coated plywood sheets sold as "Weyerhaeuser™ Concrete Form Panels/Release Coated" (see Weyerhaeuser Co. product literature PW-188, 8-72; PW-143, 2-75; PW-174, 2-69; PW-173, 1-69; PW-172, 1-69; PW-1012, 6-71; and PW-1070, 5-74). The moisture curing of the prepolymer coating was un-catalyzed and consequently the coated panels had to be racked in spaced-apart relationship overnight during mild or warm weather or during cold weather the racked coated panels were placed in an oven for 30 to 40 minutes and then held at ambient conditions overnight in order to complete curing of the prepolymer coating to a non-tacky state before the coated panels could be stacked. And though such factory prefinished panels were said to be relatively smooth and glossy, and had tough plastic faces which stripped with relative ease from hardened concrete and were reuseable, sometimes reoiling of the panel surface was employed between pours (reuses) in an effort to extend panel life.

Briefly, in one aspect, this invention provides a process for manufacturing plastic-coated substrate such as a rigid flat or sheet-like material that is preferably a wood or wood-based product like a plywood panel useful as a concrete form panel for concrete formwork used in constructing concrete structures, such as cast-in-place walls, decks, columns, piers, and the like and pre-cast or pre-stressed concrete member components of structures. The plastic coating, durably adhered to a prepared substrate, such as sealed and primed plywood sheet, is a topcoat of moisture-cured isocyanate-terminated urethane prepolymer, the cure of which is preferably catalyzed, e.g. with tertiary amine. The coated substrate or panel has a number of highly desirable characteristics or properties which are attributed to the nature of its plastic coating and the manner by which it is prepared. Two most significant characteristics are the surprisingly high degrees of specular gloss and smoothness of the surface of the plastic coating, which properties are manifested in the ready and clean release of the plastic coating from the face of the concrete hardened against it. Such characteristics together with the durability of the adhered plastic coating account for the long useful life of the coated panel. Correspondingly high specular gloss and smoothness are imparted to the face of the concrete structure hardened against the plastic coating of the panel, the face of the concrete needing reduced or minimal repair or finishing. The plastic-coated panel of this invention also has a high degree of reuseability; for example, concrete formwork comprising sheeting made of such plastic-coated panels can be reused for as many as ten to twenty or more "pours" of fresh concrete and without oiling the panels either initially or between pours, thereby significantly saving concrete formwork costs.

The method or process of preparing the improved concrete form panel is such that it can be carried out readily and economically by manufacturing the coated panels as prefabricated modular product on the continuous production line of a panel coating factory, such as that of a plywood manufacturer or custom coater finishing company, using commercially available chemical products and plywood sheets.

One coating system (a "catalyst undercoat system") used in this invention to provide the substrate such as plywood with the superior plastic coating comprises (1) a film-forming coating solution of moisture-curable isocyanate-terminated urethane prepolymer applied as a thin topcoat, (2) a coating solution of a catalyst which is applied as a thin undercoat for the prepolymer topcoat to accelerate the moisture curing thereof, and, preferably, (3) a sealing and priming liquid applied as a thin coating to the substrate, e.g. sanded plywood sheet, to ensure that the topcoat surface has the aforementioned smoothness and gloss and to enhance the efficiency of continuous factory coating processes. The catalyst coating solution is applied and preferably dried just prior to coextensively applying a thin topcoat of the coating solution of prepolymer. (The catalyst may be added to the sealing and priming liquid if it is compatible therewith, for example, if it does not gel the liquid.) The moisture cure of the prepolymer immediately begins to occur upon exposure of the coated substrate to ambient air (which contains moisture), the cure being rapidly accelerated by the catalyst, the topcoat becoming non-tacky or non-sticky in a desirably short time, e.g. within 15 minutes of applying the prepolymer coating solution, and becoming cured to a block-free state with 1 to 2 hours of the application of the prepolymer coating solution. Since the catalyst solution and prepolymer solution are separately applied, the coating system can be characterized as a liquid two-package system, the two applied compositions or components of which are apparently mixed by molecular diffusion, rather than by physical or mechanical mixing before application to the substrate. The resulting cured topcoat comprises a poly(uretha-neurea)polymer and has the above-discussed gloss and smooth surface and durability. The cured coating system is essentially void- or bubble-free or non-cellular (at least to the unaided eye), water-impermeable, water-resistant, alkali resistant, abrasion-resistant, weather-resistant, and tough. Applying the catalyst as or in an undercoat for the prepolymer, as described above, not only permits retention of the desired working pot-life of the prepolymer solution but also results in a rapidly cured topcoat that is surprisingly superior in specular gloss and smoothness to that obtained by mixing the catalyst with the prepolymer before application or by applying the catalyst over the prepolymer coating.

In another aspect of this invention, the above-described plastic-coated substrate with the high degrees of specular gloss and smoothness and durability can be made by the same above-described manufacturing process except that the coating system omits said catalyst coating solution (2) and the step of applying it to the sealed-primed coating. That is, said prepolymer coating solution (1) is applied directly to the dry seal-prime coat. The moisture curing of the prepolymer is, as a consequence of the omission of the catalyst, much slower, e.g. the tack-free state is reached in about 1 hour and block-free or non-blocking state is reached in 4 or more hours with this "non-catalyzed system."

In a still further aspect of this invention, said catalyst solution (2) and its application to the dry seal-prime coat is again omitted, but the catalyst or solution thereof is physically mixed witch said prepolymer coating solution (1) and the mixture is either kept anhydrous and applied later or is applied to the seal-prime coat soon after the catalyst-prepolymer mixture is made. A variation of the foregoing is to apply said catalyst solution to the applied prepolymer coating solution while the latter is still liquid. These two modified catalyzed systems, that is, the "mixed catalyst-prepolymer system" and the "catalyst overcoat system," though they do not result in a topcoat with high degrees of specular gloss and smoothness, do result in a topcoat which is durably adhered, provided the sealing-priming liquid that is used is an alkaline-stable, water-base composition and is applied to obtain a desired thickness, as will hereinafter be described and illustrated. The concrete form panel with such topcoat will have adequate strippability, and the face of concrete hardened against such topcoat will be acceptable, for some concrete pours, e.g. where architectural concrete surface specifications do not require high degrees of gloss and smoothness.

The isocyanate-terminated urethane prepolymer used in the practice of this invention is a known type of urethane polymer formed by reacting a stoichiometric excess of polyisocyanate (either aliphatic or, preferably, aromatic), such as a commercial mixture of the 2,4- and 2,6-isomers of toluene diisocyanate, with a polyol, such as one with a medium molecular weight in the range of 200 to 2000 and hydroxyl functionality in the range of 2 to 5, preferably 2 to 3, e.g. polyoxypropylene glycol or triol or polyester diol. Commercially available polyols useful in making the prepolymers are PPG™ 1025 and 2025 polypropylene diols, Airthane™ PET-75D polyoxybutylene diol, Joncryl™ 500 polyacrylate polyol, and L-Flex™ 188 polyester diols. Mixtures of the various polyols can be used to get desired physical properties in the cured prepolymer coating, such as hardness and elongation. The prepolymer upon reaction with moist air, e.g. with a relative humidity greater than 30% at normal room temperature, to which the prepolymer is exposed, is converted predominantly or essentially to a polyurea. The isocyanate-moisture reaction also evolves carbon dioxide, which apparently generally diffuses from the prepolymer coating due to its thinness, since the cured topcoat appears clear and transparent (such that the grain of the underlying plywood surface can be seen) and the surface of the cured topcoat made by the above-described catalyst undercoat system or the non-catalyzed system is very smooth and has high gloss (almost like glass).

The prepolymer used in applying the topcoat of this invention is in the form of an organic solvent solution, suitable solvents for this purpose being, for example, common solvents used in coating formulations, such as esters, ketones, ether-esters, aromatic solvents, and petroleum distillates, e.g., methoxy propyl acetate, xylol, ethyl-3-ethoxy propionate, and mixtures thereof. The prepolymer coating solution does not have to be mixed or blended with form oil or other oil and is preferably oil-free. The concentration of the prepolymer in said solvent solution will generally be about 40 weight percent or preferably 50 weight percent or higher, depending on the desired coating viscosity or molecular weight of the prepolymer. The prepolymer coating solution can be applied in one or more steps (or passes), two such applications usually being sufficient, without permitting significant curing one application before applying the next. The amount of prepolymer solution applied is generally that sufficient to obtain desired topcoat durability and the maximum topcoat gloss with the coating system being used. The thickness of the applied prepolymer solution cyanate, the prepolymer will be principally terminated with the group $-OC(O)NH-R''(NCO)_p$ where the $-OC(O)NH-$ portion is a urethane group and $R''$ is the organic residue of the polyisocyanate, e.g. $R''$ is methylphenylene; the subscript p is 1 to 5 and typically is 1; and the subscript z is equal to the number of active hydrogen atoms in said initiator compound and is generally 2 to 6, preferably 2 or 3. Upon moisture curing of the prepolymer, the prepolymer is converted into polyurea polymer, which retains the urethane linkages of the prepolymer; thus the cured polymer also can be called a poly(urethane-urea).

A species of prepolymer (derived from polyoxypropylene triol and toluene diisocyanate) can be represented by the formula:

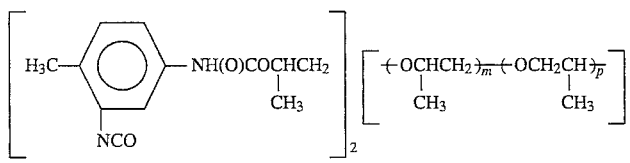

generally is 1 to 5 mils, preferably 1.5 to 3 mils, and the cured topcoat will generally be 1.5 to 3 mils.

Prepolymers useful in this invention are commercially available as solvent-free or in solution of solvents such as butyl acetate or Cellosolve™ acetate. Prepolymers and solutions thereof which can be used in this invention include those described in the aforementioned Hemming patents, which descriptions are incorporated herein by reference. A particularly useful commercial available aromatic moisture-cure urethane prepolymer is the aforedescribed Spenkel™ M86-A6X-50 which is available as a 49–51 weight percent non-volatile prepolymer solids solution in a 50/50 mixture of xylol and methoxy propyl acetate. Another such prepolymer is Spenkel™ M-26-X-64 which is available as 64 weight percent prepolymer non-volatile solids in xylol. Another moisture-curing prepolymer product which can be used is sold as Q-Thane™ MC49, which product has 40 weight percent non-volatile prepolymer solids in a mixture of ethyl 3-ethoxy propionate and xylol. Such products have short pot life in air and must be stored in tightly closed, moisture-free containers with a blanket of moisture-free inert gas such as nitrogen to prevent premature curing of the prepolymer with moist air.

A general class of prepolymers which can be used in this invention can be represented by the formula:

$$[Y_1-R-Y_2(-NCO)_p]_z \quad\quad I$$

where $Y_1$ is an active hydrogen-free residue of a low molecular weight organic initiator compound having a plurality (e.g., 2 or 3) of active hydrogen atoms, such as a polyhydroxyalkane, polyaminoalkane, or polyether polyol, e.g., ethylene glycol, ethylene diamine, glycerol, or 1,1,1-trimethylolpropane, which compound is, for example, an initiator from which polyoxypropylene diol or triol is made by reacting the initiator with propylene oxide; R is the active hydrogen-free residue chain of a high molecular weight polyol, such as said diol or triol, e.g. R is $(R'O)_o$ where $R'O$ is a polyoxypropylene chain where the subscript o is the number of oxypropylene repeating units in the chain, which number is sufficiently low so that the resulting moisture-cured prepolymer is a relatively tough plastic; $Y_2$ is an organic linkage, for example, where the prepolymer is prepared by reacting polyoxypropylene triol with polyisowhere m+p=n (e.g. 12) and the depicted oxypropylene units are randomly distributed in the chain enclosed in the right-hand brackets. In order to get desired hardness or crosslinking, the moisture-cure isocyanate-terminated prepolymer such as that in Formula I, e.g. a diisocyanate prepolymer such as shown in Formula II, can be mixed with a highly functional, relatively lower molecular weight polyisocyanate such as one with 3 to 5 isocyanate groups (or mixture thereof), e.g. a trifunctional isocyanate, a species of which is that represented by Formula III.

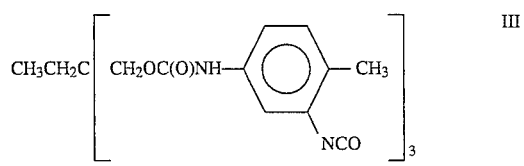

The latter can be mixed with the species of Formula II in relative amounts of about 63 mole percent of II with 37 mole percent of III (such mixture being commercially available as Spenkel™ M86-A6X-50). Preferably such mixture of II and III is modified by mixing with it a further amount of the trisocyanate of Formula III to provide a mixture containing 40 to 44 mole percent of II and 56 to 60 mole percent of III. But broadly, to get the desired hardness or crosslinking, the relative mole percent ratio of the moisture-cure prepolymer to the lower molecular weight polyisocyanate can be 4-65/35-96, preferably 25- 50/50-75. Representative of the lower molecular weight polyisocyanates, in addition to that of III, which can be mixed with the isocyanate-terminated prepolymer to obtain desired hardness or crosslinking density in the moisture-cured polymer or plastic coating, are polymeric diphenylmethane diisocyanates, such as those sold under the trademark "PAPI," e.g. a mixture of 60–70 parts Spenkel™ M86-A6X-50 or Spenlite™ M27-X-63 with 30–40 parts PAPI. Other representatives of the polyisocyanates which can be used are adducts made by reaction of diisocyanates, such as those listed in said U.S. Pat. No. 3,666,593, with short chain polyols, such as the aforesaid trifunctional initiator compounds used in making the prepolymer of Formula I, commercially available adduct products including Mondur™ CB-72, CB-75, CB-60, and CB-601, e.g. a mixture of 70 parts Spenkel™ M86-A6X-50 with 30 parts Mondur™ CB-72, -75, -60, or -601, and a mixture of 60–70 parts Spenkel™ M26-X-64 with 30–40 parts Mondur™ CB-72 or -75. Further representatives of the polyisocyanates are triisocyanurates made by trimerizing said diisocyanates of U.S. Pat. No. 3,666,593, commercially available triisocyanurates including Desmodur™ IL and Z-4370, e.g. a mixture of 70 parts Spenkel™ M86-A6X-50 with 30 parts Desmodur IL or Z-4370. Other representatives are biurets made from diisocyanates such as hexamethylene diisocyanate, commercially available biurets including Desmodur™ N-100 and N-75, e.g. a mixture of 70 parts Spenkel™ M86-A6X-50 with 30 parts Desmodur™ N-100.

The above-described prepolymer-low molecular weight polyisocyanate mixtures, which result in a moisture-cured polymer with a relatively high degree of crosslinking (or higher glass transition temperature), are particularly useful if not required, where the plastic-coated plywood sheets are used as concrete form panels in the pouring of concrete under relatively warm or hot ambient temperatures e.g. 25° C. and higher, such as encountered during summertime or in tropical or desert climes. Under such ambient conditions, the heat of hydration of curing concrete produces temperatures at the plastic coating-curing concrete interface, e.g. 50° C. and higher, which will generally be high enough to soften the moisture-cured prepolymer if it has an insufficient degree of crosslinking (or too low a glass transition temperature). Such softening may result in sticking of the plastic coating to the face of the concrete hardened against it, thereby impeding the ready and clean release of the plastic coating or concrete form panel and possibly requiring repair or finishing of the marred or rough face of the concrete. The relative amounts of the prepolymer and polyisocyanate to be used in making the moisture-cure prepolymer topcoat composition can vary, as can the particular prepolymer and polyisocyanate selected for such use, and these parameters can be determined empirically in light of the foregoing description by simple evaluation procedures, such as those described in working examples hereafter set forth.

In addition to the preferred toluene diisocyanate used to make the prepolymer, other isocyanates which can be used include aromatic or aliphatic polyisocyanates such as those described in said U.S. Pat. No. 3,666,593, which description is incorporated herein by reference.

The prepolymer solution used for the topcoat can also contain various coating adjuvants, such as leveling or flow agents, defoamers, and pigments or dyes, to impart a desired color to the cured topcoat (which is otherwise usually clear and light amber). Silicone or fluorochemical surfactants, e.g. Fluorad™ FC-430, can be used as leveling agents and defoamers can be used to minimize the formation of air or carbon dioxide bubbles in the cured topcoat.

The catalysts, when used in this invention, are catalysts known to accelerate the moisture curing of said prepolymers. Such are described, for example, in said U.S. Pat. Nos. 3,703,394, 3,666,593, and 3,468,690, which descriptions are incorporated herein by reference, and are preferably tertiary amine catalysts, a particularly useful one being 1,4-diaza-(2.2.2)bicyclooctane, which is commercially available under the trademark Dabco™. The catalyst can be dissolved or dispersed in an organic solvent to provide, for example, a 0.5 to 5 wt% solution, or in water to provide, for example, a 1 to 10 wt% solution. The amount of catalyst used can vary and will be that sufficient to accelerate the isocyanate-moisture, urea-forming reaction, such amount generally being about 0.5 to 5, preferably 1 to 2.5, parts by weight per 100 parts of non-volatile prepolymer solids in the prepolymer solution applied as topcoat. The catalyst solution will generally be coated on the seal-prime coat in a wet thickness of about 1 mil.

Coating compositions which can be used to seal and prime the unfinished face of the plywood sheets can be any of those normally used to treat such materials for such purpose and provide a less porous, scratch and water-resistant, smooth base for the subsequent coatings and enhance the smoothness of the prepolymer topcoat. An additional purpose of the seal-prime coat is to minimize or reduce migration of moisture in the wood into the applied prepolymer solution and thereby reducing the moisture from participating in the isocyanate-moisture reaction and generating bubbles. The sealing-priming liquids are preferably of the quick-drying variety, such as solvent-base or water-base, e.g. those formulated with alkyds, urethanes, epoxies, acrylates, urea-formaldehyde resins, and mixtures thereof. Sealing-priming liquids particularly useful will be those formulated to resist the peeling and other deteriorating effects on the topcoat by the alkaline conditions presented by fresh concrete or hydraulic cement. Two or more sealing-priming coats can be applied with drying and sanding between the applications and after final application to provide a smooth base for the subsequently applied coating(s). Conventional pigments and fillers can be added to the sealing-priming liquid if desired.

A preferred sealing-priming composition used in this invention is a water-based composition comprising resins and/or precursors thereof, such as those mentioned above, which in their cured state resist hydrolysis upon exposure to or contact with strongly alkaline aqueous solutions, e.g. saturated aqueous calcium hydroxide, such as in freshly poured concrete or hydraulic cement. The sealing-priming coating composition is applied to obtain a desired thickness, generally 0.4 to 1.8 mils, preferably 0.75 to 1.0 mils, which can be achieved with one heavy coat or two light coats, for example. Too thin a coating will likely result in inadequate sealing and consequent bubbling of the prepolymer coating, and too heavy a coating will likely result in adhesion failure between the poly(urethane-urea) topcoat and seal-prime coat and consequent delamination and blistering of the coating(s) upon exposure to the strongly alkaline conditions. The above-desired chemical composition of the sealing-priming liquid and said thickness thereof upon application result in a durable cured coating system, thus imparting reuseability of the coated concrete form panels of this invention.

The plywood sheets or panels coated in the practice of this invention can be any type or grade of plywood, e.g. APA grades A, B, C, D, etc., though pre-oiled or "mill-oiled" plywood, such as that sold under the trademark Plyform™, is not desirable or necessary, the plywood sheets generally useful as substrates in the practice of this invention being of the "exterior" type and non-oiled or oil-free. Preferred types of plywood are those made of Douglas Fir (a softwood) and other APA Group 1 species such as Southern Pine and Western Larch, and less preferred types are APA Group 2 species. Preferred grades are those rated by APA as B-B exterior grade or B-C exterior grade, with thicknesses which preferably are ⅜ to 1 inch, the area of such sheets normally being 4 feet× 8 feet. The more expensive hardwood plywoods, such as that with a face ply of grade N guatambu, can also be used in the practice of this invention, and even though they are of higher cost, such cost does not generally significantly off-set the savings in concrete formwork otherwise realized in using the coated plywood panels of this invention for such constructions. Other types of wood panels, such as particle boards and oriented strand board, can be used, but they would not be preferred as sheeting for concrete formwork because of their relatively lower load-bearing strength and less durability in handling. Whatever wood or wood-based substrate is used, it generally and preferably is sanded to a desired smoothness. The edges of the substrate are also preferably seal coated with the coating system used for the face of the substrate or with any other coating used for that purpose, such as wax emulsions, to make the edges water-resistant or to minimize water absorption. And though the coated panels of this invention described in detail in this specification are wood or wood-based substrates such as plywood sheets, the coating systems of this invention can also be applied to other types of substrates such as those of steel, aluminum, other metals, plastic, ceramic, and stone. Such metal substrates do not need to be sealed, but they generally would need to be treated or primed with primers that impart corrosion resistance or promote adhesion of the topcoat.

The coatings applied to the plywood in accordance with this invention can be carried out using conventional coating or finishing techniques used in the manufacture of coated panels and the like, using an O.E.M. continuous production line of semi-automated or nearly automated systems comprising conveying belts or the like to thus transport in tandem a series of panels from one station to another, e.g., sanding stations, coating stations and drying stations. Where the catalyst undercoat system or the modified catalyzed systems of the invention are used in coating the panels, the consequent rapid curing of the prepolymer coating, e.g. to a tack-free state in less than 30 minutes, and typically in about 15 minutes, less racking equipment for holding the coated panels in spaced-apart relationship during curing is required, and the finished panels can be stacked (face-to-face or face-to-back) after the cure has progressed to the block-free state, which is generally reached in 1 to 2 hours. Where the non-catalyzed system is used, the block-free state generally takes at least about 4 hours to reach; therefore that system requires more time before the coated panels can be stacked. Regardless of what coating systems are used, the production lines are similar. The equipment used in the coating stations can be fitted with automatic spraying equipment, roll coating equipment, or curtain coating equipment, and the equipment used in drying stations can be ambient or heated air blowing housing or tunnels or low temperature air ovens. Where the catalyst undercoat system or the non-catalyzed coating system is used, the finished plastic-coated panels have a topcoat (the polyurethane-urea) which, as cured according to this invention, inherently has the aforementioned high degrees of gloss and smoothness (they are obtained without rubbing or polishing or otherwise further finishing the cured topcoat). Whatever particular coating system is used, the continuous O.E.M. or factory production line and factory applied coatings used in manufacturing the coated panels of this invention means not only that they can be made economically but also that purchasers or users are provided precision-finished modular panels that are processed through machines and equipment especially adapted to the uniform application of the thin coatings under controlled conditions. Such manufacture of prefabricated panels also eliminates imperfections and time-consuming work that would result when attempts are made by relatively unskilled workmen to coat panels in the field, that is, at the construction site where they are used as concrete form panels.

Some properties of the poly(urethane-urea) topcoat of the preferred embodiments of coated panels of this invention are: Sward hardness of 25 to 50; impact resistance of "pass" (as measured by procedures described hereinafter); specular gloss (ASTM D 523-78) of at least 75 and preferably 80 or higher (measured at a 60° angle of incident light); smoothness (or roughness) values, Ra, of less than about 0.1 micrometer (as measured with a Rodenstock Model RM 600 laser stylus, as described in the examples below); and adhesion (ASTM D3359) of 4-B or better and, after soaking coated panel in saturated aqueous solution of calcium hydroxide for 5 days and then drying, as described in the examples below, of 3-B or better.

Objects and advantages of this invention are illustrated by the following examples.

In the examples, the measurement of smoothness of the surface of the cured topcoat of a coated panel is expressed in terms of specular gloss, the reference specification for this measurement being ASTM D-523-62T, using a Dr. Lange gloss meter at a 60° angle of incident light for measuring the gloss of topcoat and an 85° angle for measuring the gloss of concrete.

The impact resistance measurements reported in the examples were made by hitting the topcoat smartly (or sharply) with a 12-ounce carpenter hammer to produce indentation of about 0.5 to 1 millimeter in depth and observing whether the resulting damaged area contained cracks or delaminations—if it did, the coating was adjudged to "fail" and, if not, it was adjudged to "pass."

The tack of a coated surface was determined in the examples by a "print test": touching the surface of a coating lightly with the fingertip to see if it is sticky or leaves an impression—if not, the surface is said to be tack-free or non-tacky.

The measurements in the examples of the resistance of a topcoat to blocking was carried out according to ASTM D2793-69, using Class III conditions at 105° F. and a test specimen of 6-inch×6-inch (150 mm×150 mm)—if the coated panels stick together, according to this measurement, they "fail," and if they do not stick together, they "pass."

The measurements in the examples of adhesion of a cured coating system were carried out according to ASTM D3359-78, using a razor blade to cut at about a 45° angle to the perceptible grain of the wood and 3M filament tape #898, this measurement being made before and after soaking a coated panel specimen in a saturated aqueous solution of calcium hydroxide at room temperature for 5 to 7 days. The soaking is carried out by using a 6 in.×6 in. (150 mm×150 mm) specimen freshly cut from a coated panel and soaking the specimen while it stands essentially vertical in a sealed vessel containing a saturated aqueous solution of calcium hydroxide (viz., a strongly alkaline solution), the depth of immersion of the specimen being about 15 mm. Each day the specimen is removed from the vessel and the soaked area (including the wicked portion) is examined for coating delamination, and the specimen then returned to the vessel for further soaking. Durably adhered coatings will not peel or delaminate after 5 days of soaking, and, additionally, extremely durably adhered coatings will score 3-B or better when the portion of the specimen that is 15 to 30 mm from the soaked edge is tested by said ASTM D3359-78. Poorly adhered coatings (that is, non-durable coatings) start to peel at the edge of soaked specimen after 1 or 2 days of soaking and the time for such failure is noted.

EXAMPLE 1

A set of seven ⅝ inch thick, 1 ft.×1 ft. square panel specimens were cut from the same sheet of APA B-C Douglas Fir plywood. Such specimens were coated in accordance with various coating systems of this invention and examined.

The sealing-priming liquids used for sealing-priming the plywood panel specimens comprised a mixture of 80 wt.% Reliance Universal water base print sealer (comprising 24.1 wt.% acrylic polymer resin, 67.5 wt.% water, and 7.4 wt.% 2-butoxyethanol as coalescing agent) and 20 wt.% Beetle™ 65 resin (comprising 99 wt.% methylated urea-formaldehyde resin and less than 0.8 wt.% formaldehyde).

The catalyst composition used a solution of 1 wt.% Dabco T™ 1,4-diaza-(2.2.2)bicyclooctane in n-butyl acetate.

The isocyanate-terminated prepolymer composition used was a mixture of 99 wt.% Spenkel™ M86-A6X-50 moisture-cure prepolymer product (comprising 50 wt.% isocyanate-terminated urethane resin derived from toluene diisocyanate (TDI) and polyoxypropylene polyol, 25 wt.% methoxy propyl acetate, 5 wt.% ethyl benzene, 20% xylene and less than 1 wt.% free TDI), 0.6 wt.% BYK™ 300 paint additive leveling (or flow) agent (comprising 50 wt.% polyoxyethylene-modified dimethylpolysiloxane copolymer, 40 wt.% xylene, and 10 wt.% isobutyl alcohol), and 0.4 wt.% BYK™ 052 paint additive defoamer (comprising 28 wt.% foam destroying polymer-silicone free, 71 wt.% Stoddard solvent, and 1 wt.% 2-butoxyethanol).

A thin coat of sealing-priming liquid was applied to the specimens by using a Graco Model 700 Sprayer with a #2 nozzle at an air pressure of about 60–80 psi. Two such sealing-priming coatings were applied, the first coating being sanded with 240 grit sandpaper after 2 min. drying in an air oven at 150° F. followed by spraying of the second coating which was also then dried 2 min. in said oven. The total or overall thickness of the seal-prime coat was about 0.75 to 1.0 mil.

For Panel Specimens 1 and 3, the catalyst solution was sprayed with the Graco sprayer onto the sealed-primed specimens to provide an undercoat for the prepolymer topcoat. In preparing Panel Specimens 2 and 4, the catalyst solution was sprayed on top of the prepolymer coating. For Panel Specimens 6 and 7, the catalyst solution was mixed into the prepolymer solution and the mixture sprayed. And in Panel Specimen 5, no catalyst was used. The above-described coated plywood specimens and their evaluation are summarized in Table 1.

A second set of coated plywood specimens were prepared like those of the foregoing set except the substrate was sanded before the first sealing-priming coating application in order to minimize the effect of the wood grain on the smoothness measurement of the coating. The coated specimens were evaluated to determine the degree of smoothness (or roughness) of the poly(urethane-urea) topcoat surface. Test specimens (1 inch×3 inches) were cut from these second panels and coated with an extremely thin aluminum vapor-coating (about 25 nanometers), the smoothness of which was measured with a Rodenstock Model RM 600 laser stylus, using a 2-D program with the following settings:

Ran=±30 (micrometers ($\partial$m), Spe=10.0, Poi=8000, Lc=0.1000, Nf=10.00. The measurements were made of a 2 $\partial$m by 5 mm area of coated latewood which was uncontaminated, undamaged, and representative of the most glossy area of the topcoat. The smoothness (or roughness) measurements, Ra, are also set forth in Table 1 of the panel specimens of the second set corresponding to those of said first set.

TABLE 1

|  | Panel specimen | | | | | | |
| --- | --- | --- | --- | --- | --- | --- | --- |
|  | 1 | 2 | 3 | 4 | 5 | 6 | 7 |
| Catalyst coating: | | | | | | | |
| applied as undercoat, g/ft² | 19 |  | 10 |  |  |  |  |
| applied to prepolymer coating, g/ft² |  | 16 |  | 8 |  |  |  |
| Prepolymer coating: | | | | | | | |
| applied per se, g/ft² | 24 | 24 | 22 | 23 | 23 |  |  |
| applied with 2.0 wt % catalyst, g/ft² |  |  |  |  |  | 23 |  |
| applied with 0.75 wt % catalyst, g/ft² |  |  |  |  |  |  | 23 |
| Time to pass Print Test, min. | <15 | <15 | <15 | <15 | 60 | <15 | <15 |
| Specular gloss | 88.6 | 52.8 | 85.9 | 39.6 | 89.6 | 33.4 | 38.6 |
| Impact Resistance: | | | | | | | |
| pass | X | X | X | X | X | X | X |
| fail |  |  |  |  |  |  |  |
| Smoothness, Ra, in micrometers | 0.028 | 0.049 |  |  | 0.021 | 0.065 |  |

The data of Table 1 show that Panel Specimen 5 has expected high gloss, though its topcoat took relatively long to cure. Surprisingly, Panel Specimens 1 and 3 also have such high gloss. All the panel specimens had durable coatings, as indicated by the impact resistance data. The data also show that Panel Specimens 1 and 5 had smoothness superior to Panel Specimens 2 and 6.

EXAMPLE 2

A set of six 1 ft×1 ft panel specimens were prepared like Panel Specimen 1 of Example 1 except that the dry thickness of the seal-prime coating was varied as shown in Table 2. The adhesion of the coatings before and after soaking were measured and are set forth in Table 2. The cured topcoats of all panel specimens were clear, that is, free of bubbles, except the cured topcoat of Panel Specimen 1 which had a few bubbles (apparently because the seal-prime coat thickness was insufficient). The topcoats of all panel specimens had high gloss (their 60° specular gloss meter readings being greater than 80 and ranging from 81, for Panel Specimen 1, to 89. These data surprisingly show that durability of the coating is dependent on the thickness of the seal-prime coat.

|  | Panel Specimens | | | | | |
| --- | --- | --- | --- | --- | --- | --- |
|  | 1 | 2 | 3 | 4 | 5 | 6 |
| Seal-prime coat thickness, mils | 0.5 | 0.75 | 1.0 | 1.2 | 1.5 | 1.75 |
| Dry adhesion | 4-B | 4-B | 4-B | 4-B | 4-B | 3-B |
| Adhesion after soaking | 4-B | 4-B | 4-B | 3-B | 0-B | 0-B |

EXAMPLE 3

In this example, a plurality of coated plywood panels were made according to this invention in runs carried out on an industrial continuous coating production line with a conveyor belt over 200 feet long and having the following stations in series:

(1) a first coating station, for applying the sealing-priming coating, comprising a steel metering roll, a reverse rubber application roll, and a steel wipe roll;

(2) a 30-foot long natural gas-fired oven to dry the sealing-priming coat on a conveyor that runs at speeds up to 140 feet/min;

(3) a vented housing containing a 400-grit belt sander and brush polisher to sand the seal-prime coat;

(4) a first infrared heater housing to adjust the panel temperature to between 180° F. to 200° F. (80° C. to 95° C.);

(5) a second coating station, for applying a second sealing-priming coating, comprising a steel roll metering gap and rubber applicator roll for direct application a 3 mil maximum wet seal coating;

(6) a second infrared heater housing;

(7) a third coating station (like the second coating station), for applying catalyst coating (over the seal-prime coat and as an undercoat for the subsequently applied prepolymer topcoat);

(8) a fourth coating station (like the second coating station), for applying (over the catalyst coating) a first coating of prepolymer composition;

(9) a fifth coating station (like the second coating station), for applying a second coating of prepolymer composition;

(10) a first 30-foot hot air impingement oven (which was not turned on); and

(11) a second 30-foot hot air impingement oven (also not turned on).

After the finished coated panels stood in ambient air on racks (with the coated faces exposed) for about 15 min., the topcoats appeared tack-free by the print test and their surfaces were very glossy and smooth and otherwise looked excellent. About 120 of such plastic-coated plywood panels were made from APA B-C plywood and about 40 plastic-coated panels were made from guatambu-faced plywood. APA MDO plywood panels which were also coated by the above-described manufacturing process also looked excellent.

The plywood sheets that were coated were 4 ft×8 ft plywood panel, (one group being standard APA Douglas Fir B-C panels and another group being guatambu-faced plywood hardwood panels).

Before coating the 4 ft×8 ft panels, plywood strips (cut from the standard 4 ft×8 ft panels) were run through the line in series to establish appropriate coating thicknesses at each coating station. After adjusting coating gaps, oven heat, coating composition viscosities, coater station alignment, line height, and belt running speed, runs were carried out to successfully produce coated panels of this invention. The coated panels were tack-free in 15 min and stackable after 1 to 2 hours after the final topcoat of prepolymer was applied.

The sealing-priming coating liquid, the catalyst solution, and the prepolymer solution used in this example was that used in Example 1.

A second plurality of coated panels of this invention (using plywood faced with guarambu) were made on said production line in a similar manner as that described above but using as the catalyst solution an aqueous solution of 1.7 wt.% of the DABCO catalyst, 1.7 wt.% 1,2-propanediol, and 0.0083 wt.% Silwet L-77 surfactant, using as the sealing-priming coating the acryli-curea formaldehyde based liquid of Example 5 below and using as the topcoat composition a mixture comprising the prepolymer composition of Example 1 and Mondur™ CB-72 polyisocyanate in a volume ratio of 2.5/1.

EXAMPLE 4

In this example, the plywood panels of six different sets (each set made up of a plurality of the same type of panel) were coated by various techniques or formulations and evaluated. The panels of Sets 1, 4, and 6 were coated in accordance with this invention and the panels of Sets 2, 3, and 5 were coated by other techniques for comparison.

The base or starting plywood panels used for Set 1 were 4 ft×8 ft×¾ in. sheets of APA B-C Exterior Douglas Fir (meeting U.S. Product Standard PS 1-83). They were coated on the B face with a 2-mil thick wet coating of the sealing-priming liquid used in Example 1, using an external pump sprayer, and the coating was dried at 150° F. After cooling the coated panels to room temperature, the coating was sanded with 120 grit sandpaper. A second 2-mil thick wet coating of the sealing-priming liquid was similarly sprayed over the first seal coating and the second coating similarly dried at 150° F. A 1-mil thick wet coating of catalyst solution of Example 1 was sprayed onto the dried seal coat. A 3-mil thick wet coating of the prepolymer solution used in Example 1 was then sprayed over the air-dried catalyst coating. The resulting prepolymer topcoat was allowed to cure in ambient air and it became non-tacky in 15 min. as determined by print test. The coated panels were placed on racks (where their faces were spaced-apart) and further cured in ambient air to the block-free state in 1 to 2 hrs.

In preparing the comparison panels of Set 2, the base plywood sheets used were the same as that used in Set 1, except they were first oiled on the B-face with SAE-20 motor oil, using a paint roller, and the oiled panels allowed to remain in ambient air overnight. The oiled sheets were then coated by spraying them with prepolymer liquid to get a 2-mil wet thickness, and the prepolymer coating (which was tack-free in 10 to 15 min.) was allowed to cure overnight in ambient air. The resulting cured prepolymer coating was sanded with 120-grit sandpaper and then sprayed with further prepolymer liquid to provide a further 3-mil thick wet coating of prepolymer solution, which was allowed to cure overnight in ambient air.

In preparing the comparison plywood sheets of Set 3, the base plywood sheets and coatings and procedures used were the same as that used in Set 1, except that the prepolymer liquid used for the topcoat contained 5 wt% SAE-20 motor oil based on the weight of applied prepolymer solids. The resulting topcoat was likewise tack-free in about 15 min.

The base plywood sheets used in Set 4 were guatambu-faced plywood hardwood-faced, 4 ft×8 ft×¾ in. plywood sheets and the coatings and procedures used to prepare the plastic-coated panels of this set were otherwise the same as those of Set 1.

The base comparison sheets used for Set 5 were 4 ft×8 ft×¾ in. sheets of APA Plyform™ mill-oiled plywood. These were otherwise coated like the panels of Set 2, except the base sheets were not first oiled.

The base sheets and the coatings and procedures used for Set 6 were the same as those used in Set 1, except that the coatings were applied to the C-face.

Table 3 summarizes the above panels and their coating.

TABLE 3

|  | Set of Panels | | | | | |
|---|---|---|---|---|---|---|
|  | 1 | 2 | 3 | 4 | 5 | 6 |
| Type of plywood base: | | | | | | |
| B-C Douglas Fir | | | | | | |
| B-face coated | X | | X | | | |
| B-face preoiled | | X | | | | |
| C-face coated | | | | | | X |
| Satin-Ply ™ (coated on N face) | | | | X | | |
| B-B Plyform ™ | | | | | X | |
| Type of prepolymer composition: | | | | | | |
| oil-free | X | X | | X | | X |
| containing 5 wt % SAE 20 | | | X | | | |
| Type of undercoating: | | | | | | |
| seal-prime coat | X | | X | X | | X |
| catalyst coating | X | | X | X | | X |
| none other than oil | | X | | | X | |
| Specular gloss (60°) of cured topcoat | 81 | 46 | 45 | 89 | 44 | 75 |

Strips measuring 2 ft×8 ft were cut from coated plywood of the foregoing sets and used as concrete form panels to form the sheeting of two gang panels from which a concrete formwork was assembled for the purpose of casting-in-place two 150-foot long walls of concrete with a height of 7 feet and a width of 8 inches, the wall being cast on top of a prepared concrete footing made by conventional practice.

For purposes of comparison, some of the sheeting in the gang panels was made from commercially available plywood concrete form panels, namely APA HDO, MDO, and Plyform™ plywood and the expensive McFinnform™ concrete form panel.

In the concrete formwork, the coated faces of the concrete form panels faced inwards as sheeting (12 ft long, 8 ft high) which functioned as mold surface for the poured concrete. One gang panel was called the "south" gang panel and the other the "north" gang panel. The walls were cast in sections, one at a time, each concrete section measuring 12 feet long, 7 feet high, and 8 inches thick. After a cast section of concrete hardened, the formwork was disassembled, each of the two gang panels being stripped from the abutting hardened concrete surface, and the concrete formwork then being reassembled with the gang panels for reuse in casting-in-place the next 12-foot section of the concrete wall.

The two gang panels were made of six 2 ft×8 ft strips of panel. The "south" gang panel was made from the panels outlined in Table 4, which also describes the surface gloss of the cured prepolymer topcoats (where used). The strips in the gang panels that were cut from commercially available concrete form plywood panels were uniformly oiled at the wall construction site with Nox-Crete™ form oil (using a paint roller) before each pour. As is normally done by concrete contractors, the panels of Set 6 were oiled.

TABLE 4

|  | Gloss | | | | |
|---|---|---|---|---|---|
|  | Panel (60°) | Concrete (85°) | | | |
| Panels of "South" Gang Panel | before pour 1 | after pour 1 | after pour 5 | after pour 10 | after pour 24 |
| 1. Oiled APA MDO plywood | — | 0.1 | 0.5 | 2.0 | 1.7 |
| 2. Coated panel of Set 1 | 83 | 26 | 21 | 35 | 25 |
| 3. Oiled APA B-B Plyform ™ panel | 4 | 0.1 | 0.1 | 0.2 | 1.7 |
| 4. Oiled APA HDO panel | 7.7 | 1.5 | 2.0 | 3.8 | 1.4 |
| 5. Coated panel of Set 4 | 88 | 42 | 27 | 47 | 20 |
| 6. Oiled McFinform ™ panel | — | 3.5 | 3.9 | 5.1 | 3.5 |

The "North" gang panel was made from the panels outlined in Table 5.

TABLE 5

| Panels of "North" Gang Panel | |
|---|---|
| 1. | Coated panel of Set 1 |
| 2. | Coated panel of Set 2 |
| 3. | Coated panel of Set 3 |
| 4. | Coated panel of Set 4 |
| 5. | Coated panel of Set 5 |
| 6. | Oiled APA B-B Plyform ™ panel |

Since the concrete wall was constructed in cold weather (winter), curing additives were conventionally incorporated with the concrete mix and the concrete formwork and each wall section were covered in part with conventional insulating blanket to allow complete cure of the concrete. Mechanical vibrators were used to compact the concrete during pours, as is conventional. After each pouring, the concrete was allowed to set for 18 to 24—or longer (about 72 hours), over a week-end or holiday, on occasion, according to standard construction practice—and the formwork was disassembled and the gang panel stripped, the formwork then being moved to the next adjacent site and reassembled for the next pour.

Upon examining the faces of the concrete wall section after the first pour, it was found that the "north" concrete faces molded by coated panels of Sets 1 to 5 were smooth, glossy, very dense in appearance, uniformly light in color, with little if any wood grain imprinted from the abutting panel, and free of chalking. The indirect available light, in reflecting off the concrete face, highly accentuated the smoothness and gloss of the concrete faces. As the pours continued, however, panels of sets 2, 3, and 5 deteriorated at a much faster rate than those of Sets 1 and 4. Such deterioration was manifested by peeling off of the panel coating from some areas of the substrate and by small defects in the faces of the concrete hardened against such panels. The faces of concrete hardened against the comparison panels 2, 3, and 5 after 10 pours looked very inferior to the faces of concrete hardened against the panels of Sets 1 and 4 after 24 pours.

After the first pour, the concrete face molded by the oiled B—B Plyform™ panel had a rough surface, a very non-uniform or blotchy yellow-brown color, and wood grain imprint (which became progressively more pronounced as pours continued). The reflection of light was relatively minimal, indicating a relatively rough surface. Chalking of the surface was observed upon rubbing the concrete face with the hand, which became coated with white powder.

After the first pour, the "south" faces of the concrete hardened against the oiled MDO, HDO, and McFinnform™ panels were smooth, uniformly light in color, and exhibited no wood grain imprint. However, chalking of the concrete faces was observed and the reflection of sunlight from the faces was relatively low (that is, the gloss or sheen was relatively low) as compared to the "south" faces of the concrete hardened against panels of Sets 1 and 4.

The foregoing observations after the first pour of concrete in making the wall were generally observed after all subsequent pours, except that the faces of concrete hardened against the oiled Plyform™ panels progressively showed more wood grain imprint and more roughness.

Despite the fact that the panels of Sets 1 to 5 were not oiled between pours and the commercial panels were oiled between pours, easy removal or stripping of the panels of Sets 1 to 5 was observed. The faces of concrete hardened against the panels of Sets 1 and 4 were superior to the faces of the concrete hardened against the conventional panels.

EXAMPLE 5

Six ⅝ inch (16 mm) thick, 150 mm by 300 mm, plywood panel specimens (A to F) were prepared like Panel Specimens 1 and 3 in Example 1 except the prepolymer composition for specimens B to F additionally contained various amounts of Mondur™ CB-75 polyisocyanate and the sealing-priming liquid used as an initial coating was an acrylic-urea formaldehyde ("acrylic-UF") based liquid prepared as follows. In a 200 ml glass bottle, 69.8 g of AC-1024 acrylic latex (Rohm & Haas, 50% solids in water), 14.9 g. of Beetle-65 urea-formaldehyde resin (American Cyanamide, 98% solids), 10 g. distilled water, 4.9 g methanol, 0.2 g Drewplus L-475 defoamer (Drew Chemical Co.), and 0.2 g. Silwet L-77 wetting agent (Union Carbide Chemical) were added with mixing. The pH of the resulting mixture was adjusted to 7–8 with triethylamine. Just before use, the mixture was catalyzed by adding 1.14% by weight of para-toluenesulfonic acid as a 65% solution in water. The catalyzed sealing-priming liquid was coated on the panel specimens A to F by spraying to give a dry film thickness of 20 to 30 micrometers.

Two comparative panel specimens, C-1 and C-2, were also prepared. The first, C-1, was APA plywood grade Medium Density Overlaid Plyform (MDO) which was oiled before each use (as is normally done in the industry with this product), the oil used being Nox-Crete Sparkle™ seal form oil. The second comparative specimen, C-2, was prepared as taught in U.S. Pat. No. 3,468,690 using non-detergent motor oil (20W) as a primer and also mixing it with the moisture-curable urethane prepolymer composition formulated the same as used for Panel Specimens 1 and 3 in Example 1 except for the addition of the oil.

The panel specimens A-F, C-1, and C-2 were used as vertical walls in making 16 concrete molds, rectangular parallelepiped in shape, open at the top, with the coated sides of the panel specimens being interior surfaces of the mold. A concrete mix or "mud" was poured into each mold, vibrated, and cured in a sealed plastic bag for 20–22 hrs, half of them cured at 21° C. and the other half at 66° C. After curing, the bags were opened and the molds were disassembled. If a mold cold be disassembled by hand (without a tool), the panel specimens of that mold were considered as "easy" to strip, but if it was necessary to tap the end of a mold with a hammer to disassemble the mold, the panel specimens thereof were considered "hard" to strip. After disassembling each mold, the coated sides of the panel specimens were examined and rated for residual concrete (if any) adhering to the coated sides. After such disassembly and examination, the molds were reassembled, used again, disassembled, and reexamined. Each mold was reused, without cleaning between pours for a total of 13 pours. The molds which were made with comparative panel specimens C-1 (the MDO specimens) were re-oiled between pours with Sparkle™ seal oil.

It was found that panel specimens B through F (made with a topcoat prepolymer composition containing the prepolymer and the additional polyisocyanate) were easy to strip after each use, both at 21° C. and 66° C., whereas panel specimens A (made of a topcoat without the additional polyisocyanate) though generally easy to strip after each pour and cure at 21° C., became hard to strip after about 2 to 4 pours. Comparative panel specimen C-1 (the MDO specimen) was easy to strip after the first pour and hard to strip after all subsequent pours. And comparative panel specimen C-2 (made with a topcoat containing prepolymer mixed with motor oil) was only easy to strip after the first 4 pours at 21° C. and easy to strip after the first, second, fifth, sixth, and seventh pours, C-2 being otherwise hard to strip.

In examining the panel specimens for residual concrete, it was found that, for the concrete pour cured at 21° C., panel specimens B to F generally had no or very little residual concrete adhered after most of the pours except that panel specimens D and F had a little more residual concrete adhered after the 10th through 13th pours but only after the 12th and 13th pours was the amount significant to perhaps require cleaning of the panel specimens and/or finishing of the cured concrete face. For the concrete pours cured at 66° C., it was found that panel specimens B to F had no concrete adhered or essentially none adhered (though after the first pour, there was some concrete adhered, which was attributed to use of the panel specimen before the topcoat was fully cured). Panel specimen A was found to have no or very little concrete adhered after use in curing pours at 21° C. except until after the 12th and 13th pours, but when panel specimen A was used in curing pours at 66° C., there was significant concrete adhered after the third pour. For comparison specimens C-1 and C-2, significant residual concrete was found to be adhered after all pours cured at 21° C. and 66° C., except that C-2 specimens were found to have no adhered concrete or essentially none adhered, after each of the first 4 pours.

The foregoing results or examinations show advantages of this invention and that it is desirable to use a topcoat prepolymer composition which contains sufficient polyisocyanate, such as Mondur CB-75, to ensure easy and clean stripping of the concrete form panels of the invention, particularly where they are used in warm or hot climates.

TABLE 6

| Panel Specimens | Initial coating | Topcoat composite wt % solids | | |
|---|---|---|---|---|
| | | Prepolymer | Mondur CB-75 | Motor oil |
| C-1 | Sparkle seal | 0 | 0 | 0 |
| C-2 | motor oil | 90.5 | 0 | 9.5* |
| A | acrylic-UF | 100 | 0 | 0 |
| B | acrylic-UF | 80 | 20 | 0 |
| C | acrylic-UF | 70 | 30 | 0 |
| D | acrylic-UF | 60 | 40 | 0 |
| E | acrylic-UF | 50 | 50 | 0 |
| F | acrylic-UF | 40 | 60 | 0 |

*all the oil was considered as non-volatile solids

Various modifications and alterations of the invention will become apparent to those skilled in the art without departing from the scope and spirit of this invention.

What is claimed is:

1. Plastic-coated plywood sheet concrete form panel comprising a non-oiled base plywood sheet having on one face an oil-free topcoat of poly(urethane-urea) derived from a mixture of 25 to 50 mole percent of poly(oxypropylene) isocyanate-terminated urethane prepolymer formed by reacting a stoichiometric excess of a first polyisocyanate with a polyoxypropylene polyol having a molecular weight in the range of 200 to 2,000 in admixture with 50 to 75 mole percent of a second polyisocyanate having from three to five isocyanate groups per molecule, the curing of which mixture was accelerated by a 1,4-diaza-(2.2.2)-bicyclooctane applied in an aqueous solvent as an undercoat for said topcoat, said topcoat having a specular gloss (60 degrees) of at least 75, a smoothness Ra value of less than 0.1 micrometer, being sufficiently crosslinked to resist softening at 50° C. and being adhered to said base plywood sheet by an alkali resistant seal-prime coating having a thickness of 0.4 to 1.8 mils.

2. The sheet of plastic-coated plywood of claim 1 wherein said second polyisocyanate is represented by the formula:

3. The sheet of plastic-coated plywood of claim 1 wherein said polyol has a hydroxyl functionality of 2.

4. A sheet of plastic-coated plywood having a topcoat of polymer derived from a mixture of 25 to 50 mole percent of moisture-curable isocyanate-terminated urethane prepolymer derived from a reaction of a first polyisocyanate with a polyoxypropylene polyol having a molecular weight in the range of 200 to 2,000 and hydroxyl functionality in the range of 2 to 5 with 50 to 75 mole percent of a second polyisocyanate with 3 to 5 isocyanate groups per molecule, said topcoat being coated onto an alkali-resistant seal-prime coat, and wherein said moisture-cure of said prepolymer was accelerated by a catalyst applied in an aqueous solvent to said seal-prime coat as an undercoat for said topcoat, said topcoat when polymerized is suitable for repeated use at temperatures exceeding 50° C. without softening.

5. The sheet of plastic coated plywood of claim 4 wherein said catalyst is a tertiary amine.

6. The sheet of plastic-coated plywood of claim 4 wherein said catalyst is 1,4-diaza-(2.2.2)bicyclooctane, 7. The sheet of plastic-coated plywood of claim 4 wherein said sheet is suitable for repeated use at temperatures of 66° C.

8. The sheet of plastic-coated plywood of claim 4 wherein said prepolymer is a poly(oxypropylene)isocyanate-terminated urethane prepolymer and said second polyisocyanate being represented by the formula:

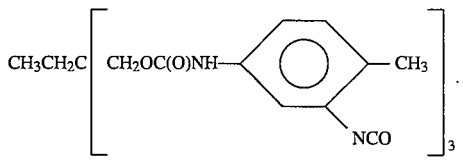

9. The sheet of plastic coated plywood of claim 8 wherein said catalyst is 1,4-diaza-(2.2.2)bicyclooctane.

10. The coated article of claim 4 wherein said second polyisocyanate has 3 isocyanate groups per molecule.

11. A sheet of plastic-coated plywood having a topcoat of polymer derived from a moisture-curable mixture of (a) 25 to 50 mole percent of isocyanate-terminated prepolymer formed by reacting a stoichiometric excess of a polyisocyanate with a polyoxypropylene polyol having a molecular weight in the range of 200 to 2,000 and (b) 50 to 75 mole percent of a polyisocyanate or mixture of polyisocyanates with 3 to 5 isocyanate groups per molecule, said topcoat being coated onto an alkali-resistant seal-prime coat, and wherein moisture curing of said mixture was accelerated by a catalyst applied on or in said seal-prime coat.

12. The plastic-coated plywood of claim 11 wherein said catalyst is a tertiary amine.

13. The plastic-coated plywood of claim 11 wherein said catalyst is 1,4-diaza-( 2.2.2)bicyclooctane.

* * * * *

UNITED STATES PATENT AND TRADEMARK OFFICE
CERTIFICATE OF CORRECTION

PATENT NO. : 5,464,680
DATED : November 7, 1995
INVENTOR(S) : Edward R. Hauser et al It is certified that error appears in the above-indentified patent and that said Letters Patent is hereby corrected as shown below:

Column 19, line 40, insert the following formula missing from claim 2:

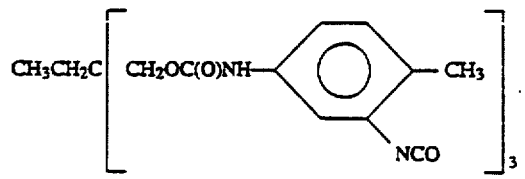

Signed and Sealed this

Sixteenth Day of January, 1996

BRUCE LEHMAN

*Attest:*

*Attesting Officer*   Commissioner of Patents and Trademarks